Dec. 17, 1935.  W. M. GETTYS  2,024,213
POWER TAKE-OFF CONTROL
Filed Oct. 5, 1934
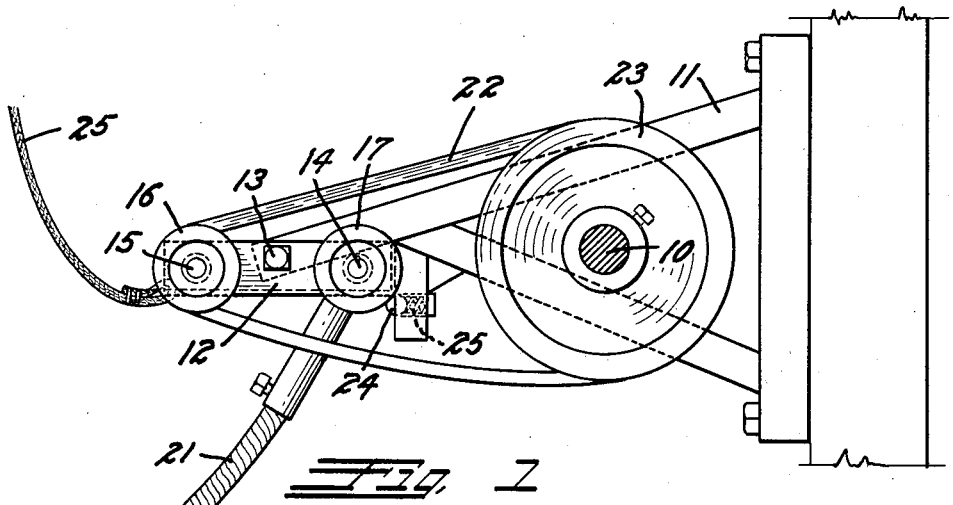
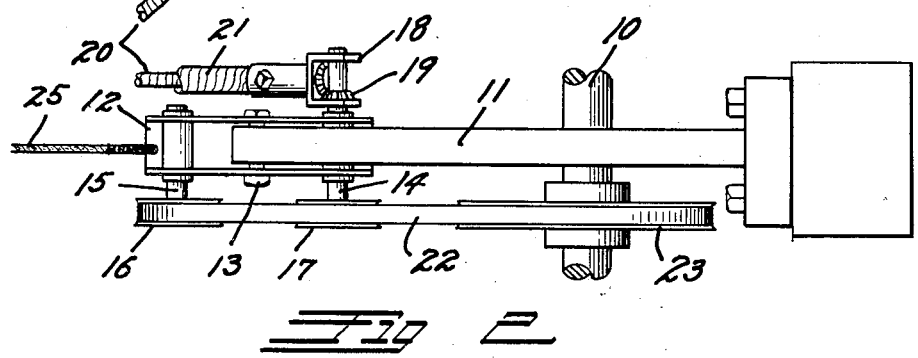
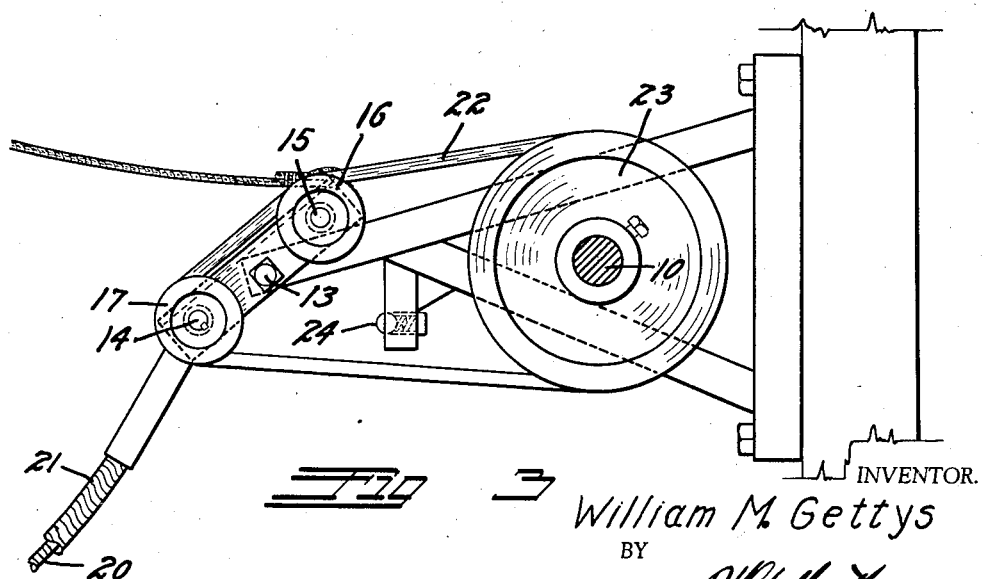
INVENTOR.
William M. Gettys
BY
ATTORNEY.

Patented Dec. 17, 1935

2,024,213

UNITED STATES PATENT OFFICE 2,024,213

POWER TAKE-OFF CONTROL

William M. Gettys, Greeley, Colo.

Application October 5, 1934, Serial No. 747,003

5 Claims. (Cl. 74—221)

This invention relates to a power transmitting and control device for general application and especially adapted for sheep shearing stations in a power driven sheep shearing installation. The principal object of the invention is to provide a simple and highly efficient unit for connecting or disconnecting a sheep shearing unit from a line shaft such as employed in the usual shearing shed.

Another object of the invention is to so construct the device that all belt shifting mechanisms, and all clutch mechanisms will be eliminated.

A further object is to so construct the unit that the power consumption will be small; so that it can be instantaneously shifted from the "off" to "on" position or vice versa; and so that wear and tear upon the drive belt will be reduced to a minimum.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:—

Fig. 1 is a side elevation of the improved unit connected with a typical line shaft. In this figure the mechanism is shown in the "off" position.

Fig. 2 is a plan view thereof.

Fig. 3 is a view similar to Fig. 1, illustrating the mechanism in the "on" position.

The usual sheep shearing shed contains a relatively long line shaft extending throughout the length of the shed. At stations along the shaft, means are provided and taking off power to a flexible shaft for driving the shears.

The present invention relates to a device for taking off the power from the line shaft at the stations. In the drawing a typical line shaft is indicated at 10. At the station positions along the line shaft, bracket members 11 are erected. These bracket members may be secured to any suitable supporting structure, such as the columns which support the shed and shaft, or to the wall, or in any other suitable position. The brackets extend outwardly beyond the line shaft 10, and support at their extremities a pivoted bearing support 12.

As illustrated, the bearing support 12 consists of a channel member having a U-shaped cross section and pivoted substantially at its midpoint on a suitable pivot bolt 13 to the extremity of the bracket 11. At one extremity of the bearing member 12, a relatively short power shaft 14 is journalled. At the other extremity, an idler shaft 15 is journalled.

The idler shaft 15 carries an idler pulley 16 and the power shaft 14 carries a power pulley 17, keyed or otherwise secured. The drive shaft 14 extends entirely through the bearing member 12, terminating in the usual universal bracket 18, such as employed in sheep shearing units. Such a bracket supports a pair of miter gears 19, one of which drives a flexible shaft 20 which extends through a flexible housing 21 to the shears proper.

The pulleys 16 and 17 are of the V-belt type, and are driven from a V-belt 22 which passes around a V-belt drive pulley 23, keyed or otherwise secured on the drive shaft 10.

The bearing member 12 is free to turn upon its pivot bolt 13 so that it can be swung from the "off" position of Fig. 1 to the "on" position of Fig. 3 or vice versa. When in the position of Fig. 1, it will be noted that the V-belt 22 is entirely out of engagement with the power pulley 17 so that no power is being trasnsmitted through the flexible shaft to the shears. When in the position of Fig. 3, both pulleys 16 and 17 are in engagement with the V-belt, and power is being transmitted to the power pulley 17 for operating the shears. In the latter position, the idler pulley 16 acts simply as a belt tightener.

Assuming that the drive pulley 23 is rotating in a clockwise direction, as indicated by the arrow in Fig. 1, the natural belt drag caused by this direction of rotation tends to constantly urge the bearing member 12 in a clockwise direction or to the "on" position of Fig. 3. To prevent the bearing member from acting on this urge, a suitable latch must be provided.

As illustrated, the latch comprises a ball 24 propelled by a spring 25. The ball 24 engages the extremity of the bearing member 12 when the latter is in the position of Fig. 1 so as to hold it in this latter position. Should the operator desire to start shearing, it is only necessary that he pull upon the flexible housing 21. This will release the bearing member from its latch so that the belt rotation may swing it to the "on" position of Fig. 3.

Any suitable means may be provided for returning the bearing member to the "off" position. It has been found that a flexible cable 25 secured to one extremity of the bearing member, serves admirably for swinging the member to the "off" position. The cable may extend to any convenient point so that it may be easily reached by the shearer.

It can be readily seen that with the above construction, practically no power is absorbed when in the "off" position, and no belt shifting or clutching devices are necessary to bring the device to the "on" position.

Some sheep shearing units use a shaft with universal joints in place of the flexible shaft 20. The invention would be equally applicable to such an installation. While the invention has been decribed as pertaining particularly to sheep shearing units, it is of course not limited to this particular use, but will find application wherever it is desired to control delivered power to a tool or other device.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A power control for the line shaft of sheep shearing installations and the like comprising: a support; a drive pulley on said shaft adjacent said support; a bearing member pivoted to said support; an idler pulley journalled adjacent one extremity of said bearing member; a power pulley journalled adjacent the other extremity of said bearing member; a belt extending from said drive pulley around said idler pulley; and means for swinging said bearing member so as to bring said power pulley into or out of contact with said belt while said idler pulley remains continuously in contact with said belt.

2. A power control for the line shaft of sheep shearing installations and the like comprising: a drive pulley secured on said line shaft; a bracket positioned adjacent said drive pulley; a channeled bearing member pivoted adjacent its midpoint on said bracket, and overlapping both sides of the latter; an idler shaft journalled at one extremity of said bearing member; a power shaft journalled at the other extremity of said bearing member; an endless belt extending around said idler pulley and said power pulley; means for connecting said power pulley to a driven shaft; and means for swinging said bearing member so as to bring said power pulley into contact with said belt when desired.

3. A power control for the line shaft of sheep shearing installations and the like comprising: a drive pulley secured on said line shaft; a bracket positioned adjacent said drive pulley; a channeled bearing member pivoted adjacent its midpoint on said bracket, the channel of said bearing member overlapping both sides of said bracket; an idler shaft journalled at one extremity of said bearing member; a power shaft journalled at the other extremity of said bearing member; an endless belt extending around said idler pulley and said power pulley; means for connecting said power pulley to a driven device; means for swinging said bearing member so as to bring said power pulley into contact with said belt when desired; and means for stopping the swinging movement of said bearing member so as to hold said power pulley in the "off" position; and means for releasing said bearing member so as to allow said belt to swing said bearing member to the "on" position.

4. A power control for use in taking off power from a line shaft in sheep shearing installations and the like comprising: a drive pulley mounted on said line shaft; a bearing support; a fixed pivot for said bearing support allowing it to swing in a plane at right angles to said line shaft; a power shaft journalled in said bearing support to one side of said pivot; an idler shaft supported by said bearing support at the opposite side of said pivot; a power pulley secured on said power shaft in alignment with said drive pulley; an idler pulley mounted on said idler shaft in alignment with said power pulley; an endless belt trained around said drive and idler pulleys and supported entirely thereby, said power pulley being normally positioned between said idler and drive pulleys and out of contact with said belt; and means for swinging said bearing member so as to bring said power pulley into contact with said belt.

5. A power control for use in taking off power from a line shaft in sheep shearing installations and the like comprising: a drive pulley mounted on said line shaft; a bearing support; a fixed pivot for said bearing support allowing it to swing in a plane at right angles to said line shaft; a power shaft journalled in said bearing support to one side of said pivot; an idler shaft supported by said bearing support at the opposite side of said pivot; a power pulley secured on said power shaft in alignment with said drive pulley; an idler pulley mounted on said idler shaft in alignment with said power pulley; an endless belt trained around said drive and idler pulleys and supported entirely thereby, said power pulley being normally positioned between said idler and drive pulleys and out of contact with said belt; means for swinging said bearing member so as to bring said power pulley into contact with said belt; a first stop member positioned to stop the swinging movement of said bearing member when both said power and idler pulleys are engaging said belt; and a second stop member for stopping said movement when only said idler pulley is in engagement with said belt.

WILLIAM M. GETTYS.